INVENTORS.
Clifton A. Cobb
Carrol A. Orr
William F. Robandt, Jr.
By Hofgren, Brady, Wegner, Allen & Stellman
Attys

United States Patent Office 3,045,696
Patented July 24, 1962

---

3,045,696
MIXING VALVE FOR HOME APPLIANCE
Clifton A. Cobb, Carrol A. Orr, and William F. Robandt, Jr., St. Joseph, Mich., assignors to Whirlpool Corporation, a corporation of Delaware
Filed Nov. 2, 1959, Ser. No. 850,238
3 Claims. (Cl. 137—607)

This invention relates to methods of mixing fluids and to mixing valves.

In structures such as laundry appliances, it is necessary to provide fluid, such as water, at any one of a plurality of different temperatures. The instant invention comprehends a method of and valve structure for providing water at up to five different temperatures from two different temperature supplies. Illustratively, where one supply is of cold water and the other supply is of hot water, any one of cold water, medium cold water, medium water, medium hot water, or hot water may be obtained.

Thus, one of the features of the invention is to provide a method of providing fluid to a first space selectively at one of a first temperature or successively higher or lower second, third, fourth or fifth temperatures including the steps of delivering fluid having the first temperature to a second space, delivering fluid having the fifth temperature to a third space, and selectively causing (a) flow only of the first temperature fluid from the second space to the first space to provide the first temperature fluid thereat, (b) flow of the fifth temperature fluid from the third space to only the second space at a reduced rate and flow of the fifth temperature fluid and first temperature fluid from the second space to the first space to provide second temperature fluid thereat, (c) flow of the first temperature fluid from the second space to the first space and similar flow of the fifth temperature fluid from the third space to the first space to provide third temperature fluid thereat, (d) flow of the first temperature fluid from the second space to the third space only at a reduced rate and flow of the first temperature fluid and fifth temperature fluid from the third space to the first space to provide fourth temperature fluid thereat, or (e) flow only of the fifth temperature fluid from the third space to the first space to provide fifth temperature fluid thereat.

A further feature of the invention is the provision of a new and improved mixing valve structure including means forming a mixing chamber, means forming a first fluid inlet passage into said chamber, means forming a second fluid inlet passage into said chamber, means forming a relatively restrictive flow by-pass passage interconnecting the inlet passages, first valve means for opening and closing the first inlet passage into the chamber, second valve means for opening and closing the second inlet passage into the chamber, third valve means for opening and closing the by-pass passage, and means for selectively operating the valve means.

Another feature is that the valve may be employed for providing mixtures of fluids having characteristics which differ in respects other than temperature.

Other features and advantages of the invention will be apparent from the following description, taken in connection with the accompanying drawing wherein.

Figure 1:
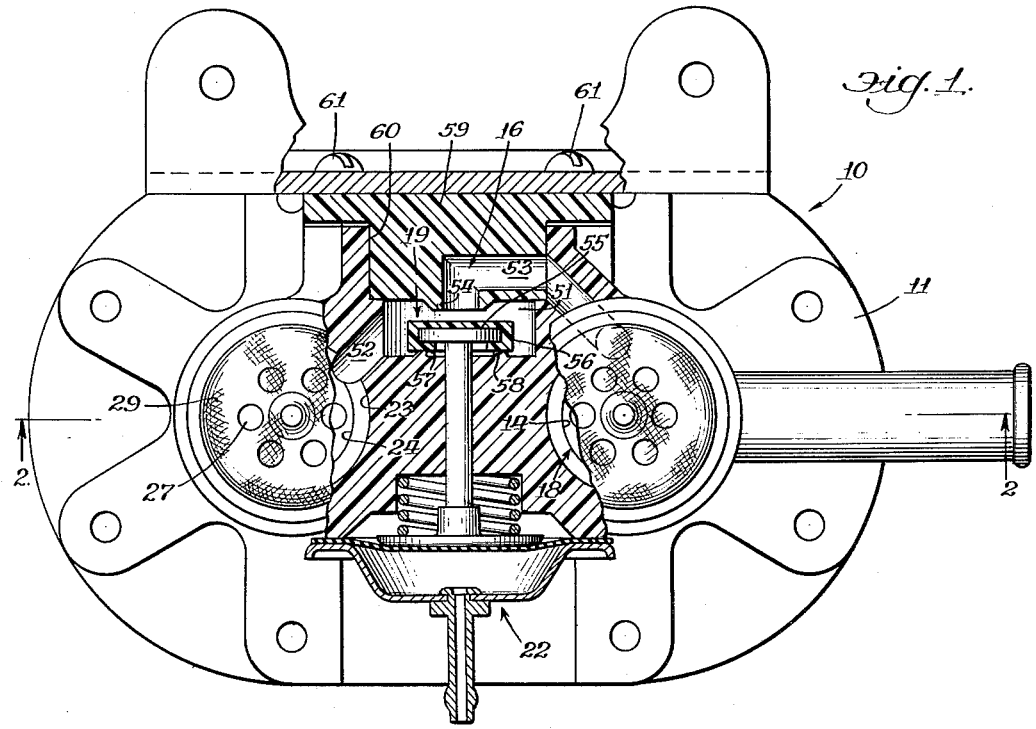
FIGURE 1 is a plan view of a valve structure embodying the invention, with portions thereof broken away.

In the illustrative embodiment of the invention as disclosed in the drawing, a mixing valve generally designated 10 comprises a valve body 11 forming a mixing chamber 12, a first fluid inlet passage 13 leading into mixing chamber 12, and a second fluid inlet passage 14 also leading into mixing chamber 12. One end 15 of mixing chamber 12 is open to form an outlet for delivery of fluid mixed in chamber 12. As best seen in FIGURE 1, a fluid by-pass passage generally designated 16 interconnects first inlet passage 13 and second inlet passage 14, by-pass passage 16 haivng a relatively small cross sectional area to provide a retricted flow of fluid therethrough.

Control of fluid flow to mixing chamber 12 is effected by selective operation of three valve means, first valve means 17 in first inlet passage 13, second valve means 18 in second inlet passage 14, and third valve means 19 in by-pass passage 16. First valve means 17 is operated by a first control means 20 to open and close the first inlet passage 13 into mixing chamber 12, second valve means 18 is operated by a second control means 21 to open and close second inlet passage 14 into chamber 12, and third valve means 19 is operated by a third control means 22 to open and close the by-pass passage interconnecting the inlet passages 13 and 14.

Figure 2:
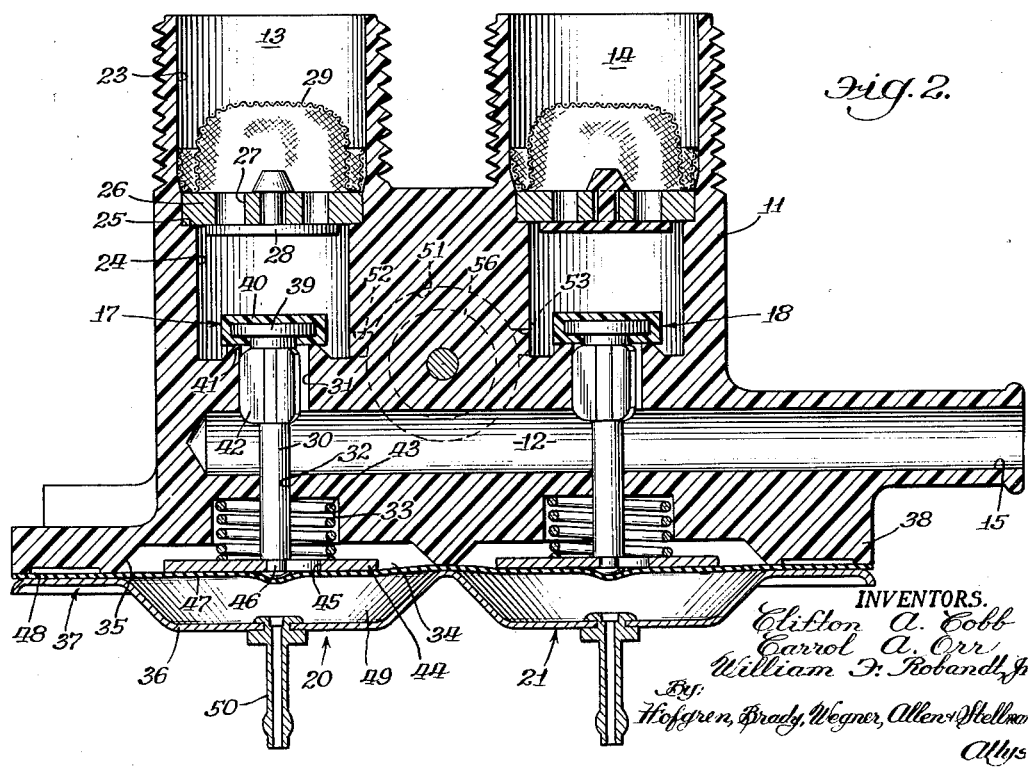
FIGURE 2 is a vertical section thereof taken substantially along the line 2—2 of FIGURE 1.

As best seen in FIGURE 2, first inlet passage 13, first valve means 17, and first control means 20 are respectively identical to second inlet passage 14, second valve means 18, and second control means 21. Thus, while the following description is directed specifically to inlet passage 13, valve means 17 and control means 20, it is to be understood that inlet passage 14, valve means 18 and the control means 21 include substantially identical elements.

First fluid inlet passage 13 includes an outer portion 23 and a reduced diameter inner portion 24 with a radial shoulder 25 therebetween. Seated in passage portion 23 in abutment with radial shoulder 25 is a check valve orifice plate 26 provided with a plurality of distributed orifices 27 and a resilient valve member 28 permitting ready flow of fluid from passage portion 23 to passage portion 24 but preventing reverse flow thereof. Extending across passage portion 23 upstream of the check valve orifice plate is a dome-shaped screen 29 for filtering the fluid as it is delivered through the orifice plate to passage portion 24.

Valve means 17 comprises a valve stem 30 extending downwardly through an inlet port 31 in valve body 11 and extending between passage portion 24 and mixing chamber 12, downwardly through mixing chamber 12, downwardly through a stem hole 32 in the valve body below mixing chamber 12, downwardly through a spring recess 33 opening downwardly from hole 32, and terminating in a control chamber 34 defined by a downwardly opening recess 35 in valve body 11 and a complementary dished portion 36 of a cover 37 secured to the bottom 38 of the valve body. At its upper end, the valve stem 30 is provided with a head 39 covered by a pad 40 arranged to seat on an annular valve seat 41 at the upper end of inlet port 31. The valve stem is guided for vertical movement through inlet port 31 by a plurality of vanes 42 extending radially from the valve stem into sliding engagement with the wall of the port. The valve stem is biased downwardly by a spring 43 in recess 33 and bearing at its lower end against a button 44 secured to the lower end of the valve stem by cooperating keyhole slot means 45 in the button 44 and annular groove 46 in the lower end of the valve stem. Button 44 is urged by spring 43 against a portion 47 of a flexible diaphragm 48 extending across control chamber 34 and sealingly secured peripherally of the control chamber between valve bottom 38 and cover 37. Movement of valve stem 30 against the action of spring 43 is effected by admitting pressurized fluid to the portion 49 of control chamber 34 below diaphragm portion 47 through an inlet nipple 50 extending through cover portion 36.

As discussed above, fluid by-pass passage 16 interconnects first fluid inlet passage 13 and second fluid inlet passage 14. More specifically, by-pass passage 16 includes a valve chamber 51 in valve body 11 intermediate inlet passages 13 and 14. A first passage portion 52 extends from valve chamber 51 to first fluid inlet passage 13 and a second passage portion 53 extends from valve chamber 51 to second fluid inlet passage 14. Third control means 22 closes by-pass passage 16 by closing the inner end of second passage portion 53 which is defined by an annular valve seat 54. Valve means 19 and control means 22 are generally similar to valve means 17 and control means 20 as described above and function similarly except that the outer portion 55 of the pad 56 seats on the seat 54 when the valve is closed and the inner portion 57 of the pad seats on an annular boss 58 when the valve is open. To permit access to the valve within valve chamber 51 when desired, the outer portion of the valve chamber is defined by a plug 59 received in a suitable recess 60 in valve body 11 and secured to the valve body by suitable means such as screws 61. As best seen in FIGURE 1, the inner end of passage portion 53 and the annular valve seat 54 are provided in plug 59.

As discussed above, mixing valve 10 provides fluid selectively at any one of five different temperatures when different temperature fluids are provided respectively to inlet passage 13 and inlet passage 14. More specifically, assuming that cold water is delivered to first inlet passage 13 and hot water is delivered to second inlet passage 14, the different valve arrangements provide water at outlet 15 as follows. (In the following discussion, mixing chamber 12 will be considered as comprising a first space, first fluid inlet passage 13 will be considered as comprising a second space, and third fluid inlet passage 14 will be considered as comprising a third space. The cold water delivered to second space 13 will be considered as comprising the first temperature water, and the hot water delivered to third space 14 will be considered as fifth temperature water. Thus, the mixing valve will provide to the first space 12, selectively, first or fifth temperature water as well as successively higher second, third and fourth temperature water intermediate the first and fifth temperatures. These will be termed successively as cold, medium cold, medium, medium hot and hot water temperatures.)

(*a*) *Cold*.—With valve means 17 open by admitting pressurized fluid to control means 20, valve means 18 in its normally closed position, and valve means 19 closed by admitting the pressurized fluid to control means 22, flow of first temperature cold water only to first space 12 from second space 13 is effected.

(*b*) *Medium Cold*.—With valve means 17 open by admitting pressurized fluid to control means 20, valve means 18 in its normally closed position, and valve means 19 in its normally open position, fifth temperature hot water will flow at a relatively low rate from third space 14 through passage 16 to second space 13 where it will mix with the first temperature cold water therein and pass as second temperature medium cold water to first space 12.

(*c*) *Medium*.—With valve means 17 and 18 open by admitting pressurized fluid to each of control means 20 and 21, and with valve means 19 in its normally open position, similar flows of first temperature cold water from second space 13 to first space 12 and fifth temperature hot water from third space 14 to first space 12 will be effected. As equal volumes of hot and cold water are delivered to the first space 12, the resultant mixture will comprise third temperature medium temperature water.

(*d*) *Medium Hot*.—With valve means 17 maintained in its normally closed position, valve means 18 opened by admitting pressurized fluid to control means 21, and valve means 19 in its normally open position, first temperature cold water will flow at a reduced rate from second space 13 through passage 16 to third space 14 wherein it will mix with the fifth temperature hot water and pass to first space 12 as fourth temperature medium hot water.

(*e*) *Hot*.—With valve 17 maintained in its normally closed position, valve 18 opened by admitting pressurized fluid to control means 21, and valve 19 closed by admititng pressurized fluid to control means 22, fifth temperature hot water only will flow from third space 14 to first space 12.

While the operation of the mixing valve is described in connection with a five temperature water delivery, it is obvious that the valve may be used to provide other combinations of different temperature water such as a three temperature combination of hot water, medium water and medium cold water. To effect this, hot water may be delivered to second space 13 and cold water may be delivered to third space 14 and only valve arrangements (*e*), (*c*) and (*b*) (as described above relative to the five temperature operation) need be effected.

It should be noted also that elimination of by-pass valve means 19 will produce only fluid temperatures of medium cold, medium and medium hot.

Further, valve 10 may be employed for delivering mixtures of fluids which differ in other respects, e.g. controlled mixtures of flavored syrup and carbonated water may be provided therewith.

While we have shown and described one embodiment of our invention, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. A mixing valve structure comprising: means forming a mixing chamber; means forming a first fluid inlet passage into said chamber; means forming a second fluid inlet passage into said chamber; means forming a relatively restricted flow by-pass passage interconnecting said inlet passages for flow in both directions therethrough; first valve means for opening and closing said first inlet passage into said chamber; second valve means for opening and closing said second inlet passage into said chamber; third valve means for opening and closing said by-pass passage; and means precluding fluid flow from said by-pass passage and outward through said inlet passages away from the mixing chamber.

2. A mixing valve structure comprising: means forming a mixing chamber; means forming a first fluid inlet passage into said chamber; means forming a second fluid inlet passage into said chamber; means forming a relatively restricted flow by-pass passage interconnecting said inlet passages for flow in both directions therethrough; first valve means for opening and closing said first inlet passage into said chamber; second valve means for opening and closing said second inlet passage into said chamber; third valve means for opening and closing said by-pass passage; means biasing said third valve means to an open position; means for operating said third valve means including means for closing said third valve means when fluid from either of said first and second passages only is to be delivered to said chamber; and means precluding fluid flow from said by-pass passage and outward through said inlet passages away from the mixing chamber.

3. A valve structure comprising: means forming a first fluid passage; means forming a second fluid passage; means forming a relatively restricted flow by-pass passage interconnecting said first and second passages for flow in both directions therethrough; first valve means in said first passage downstream of said by-pass passage for opening and closing said first passage; second valve means in said second passage downstream of said by-pass passage for opening and closing said second passage; third valve means for opening and closing said by-pass passage; and mean precluding fluid flow from said by-pass passage and outward through said inlet passages away from the mixing chamber.

References Cited in the file of this patent

UNITED STATES PATENTS

| | | |
|---|---|---|
| 1,108,550 | Chubb | Aug. 25, 1914 |
| 2,698,029 | Branson | Dec. 28, 1954 |
| 2,748,799 | Rath | June 5, 1956 |
| 2,842,155 | Peters | July 8, 1958 |
| 2,893,425 | Rimsha | July 7, 1959 |